BEST AVAILABLE COPY

T858017

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 21, 1969

858 O.G. 724

662,288

COATED POLYMERS

Harold Boardman, P.O. Box 523, R.D. 1, Fairville Road, Chadds Ford, Pa. 19317

Filed Aug. 22, 1967. Published Jan. 21, 1969

Class 101—453

No Drawing. 13 Pages Specification

Polyolefins, polystyrene, styrene copolymers, blends of polystyrene with styrene-butadiene copolymers, poly (vinylidene chloride), vinyl chloride-vinylidene chloride copolymers, poly(vinyl chloride) and poly[bis(chloromethyl)oxetane] can be made antistatic, less permeable to gases, more receptive to printing and adherent to coatings by vacuum depositing a coating, less than about $3\times10^{-6}$ inch in thickness, of silicon dioxide on their surface. The thus coated polymers are particularly useful as lithographic plates provided the polymer is in the form of a smooth sheet and the silicon dioxide coating is of a thickness between about $3\times10^{-6}$ inch and about $0.1\times10^{-6}$ inch. The thus coated polymer can also be top coated with an aqueous dispersion of an alkali metal silicate, boric acid and a finely divided metallic agent. Depending upon the size of the particles in the dispersion and resulting roughness, top-coated sheets can be used as lithographic plates, abrasive sheets, etc. In vacuum depositing the silicon dioxide onto the surface of the polymer, a high temperature such as provided by electron beam heating will be required.